Feb. 13, 1951     R. W. CANFIELD     2,541,203
APPARATUS FOR FORMING PLASTIC SHEETS
Filed Oct. 11, 1947     3 Sheets-Sheet 3
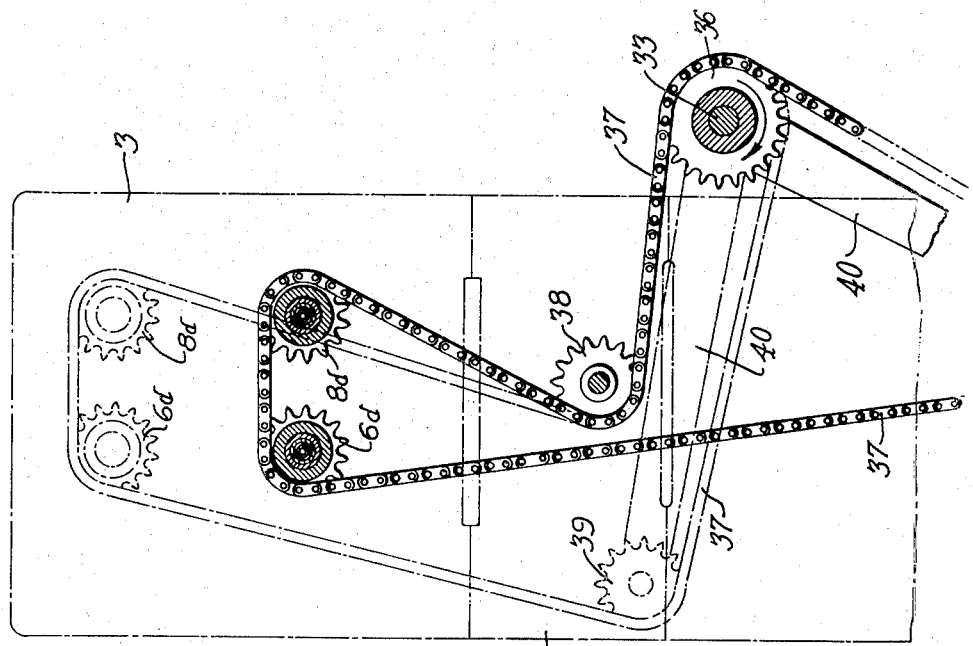
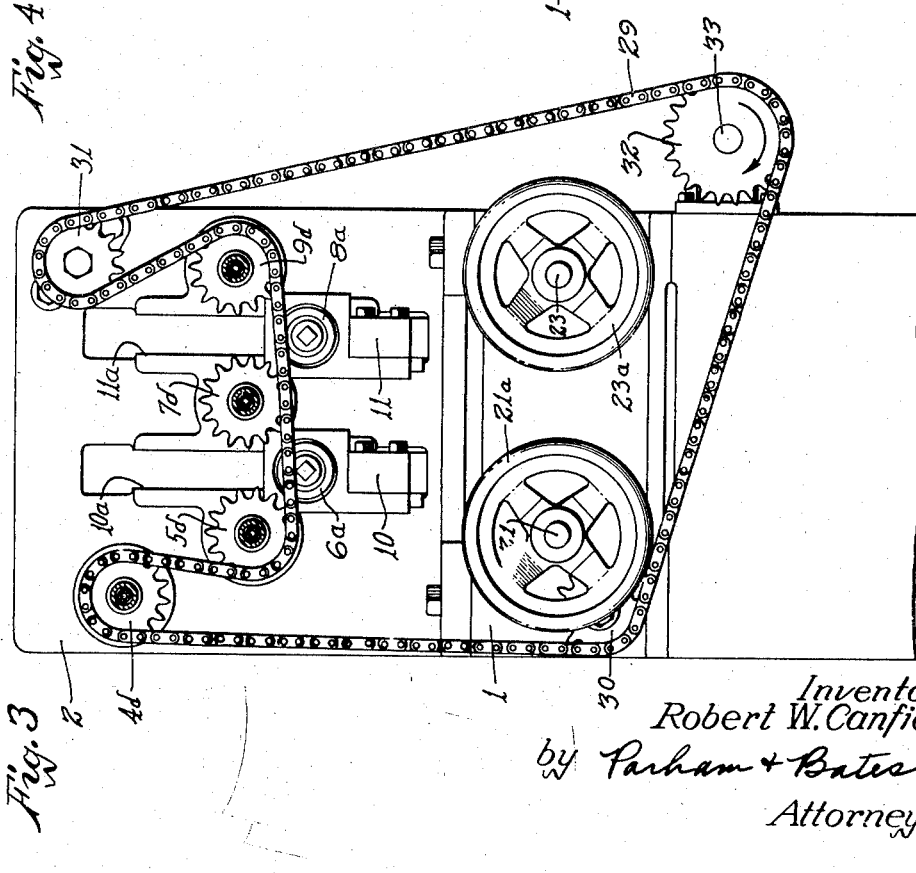
Inventor
Robert W. Canfield
by Parham + Bates
Attorneys Patented Feb. 13, 1951

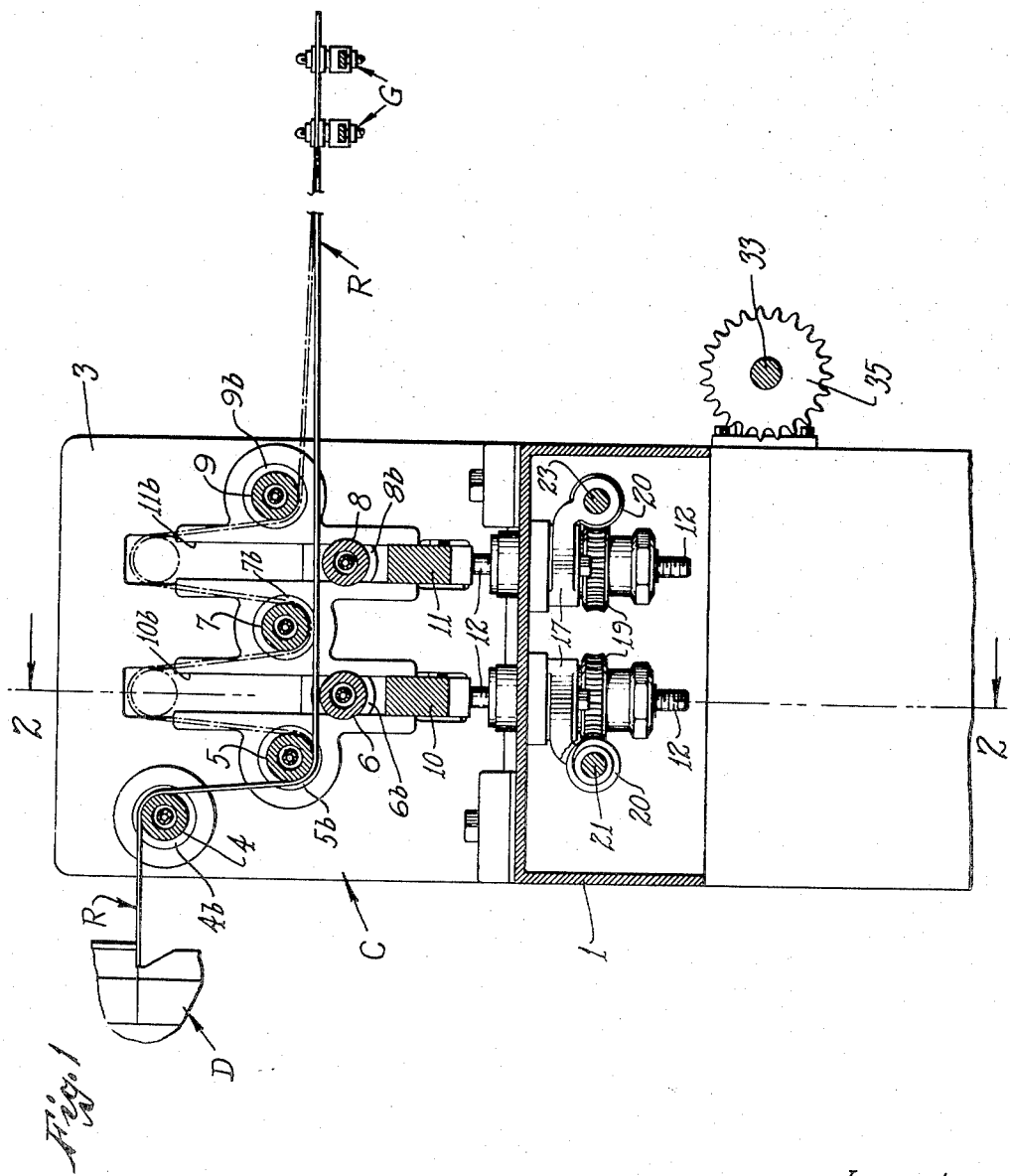

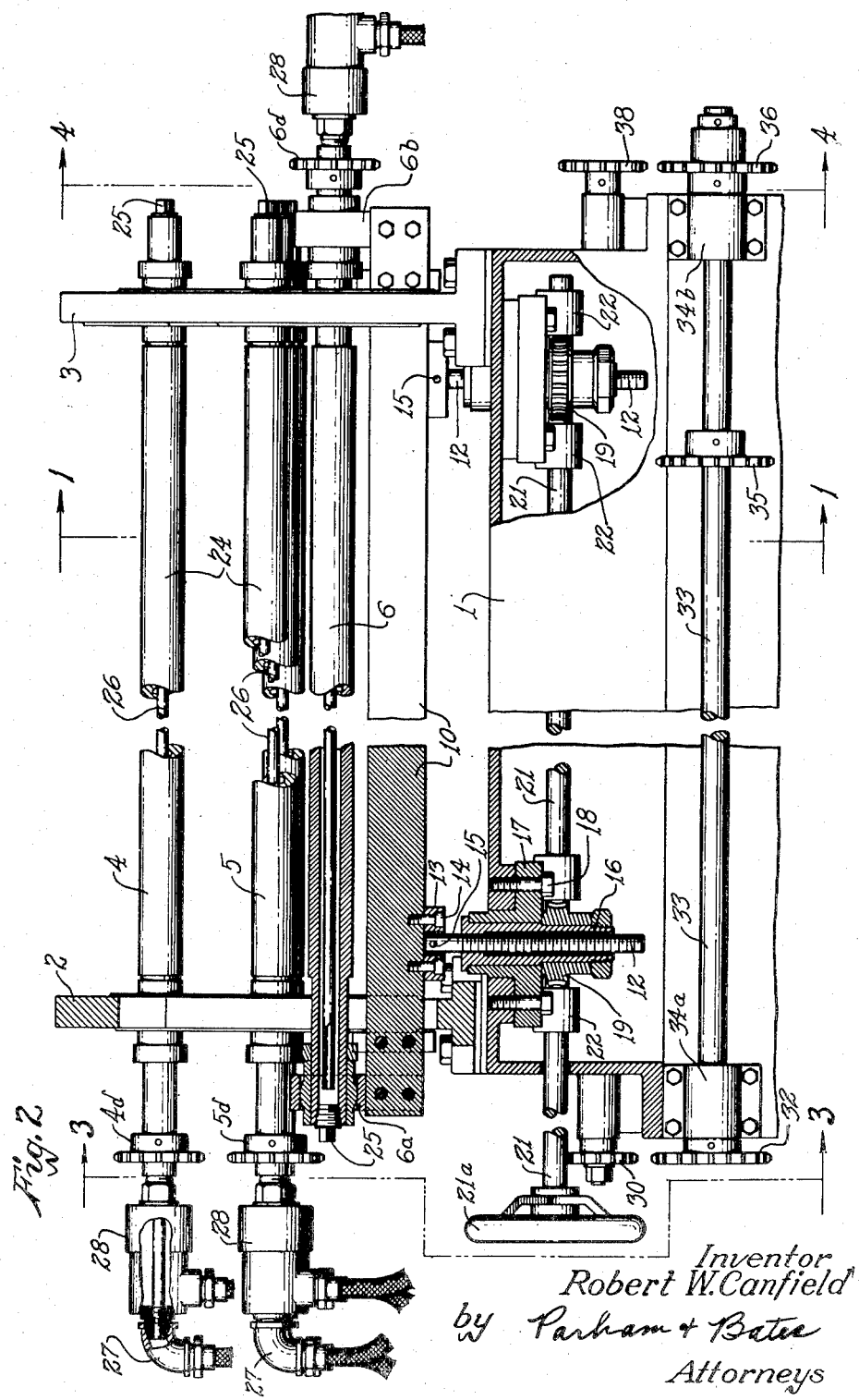

2,541,203

UNITED STATES PATENT OFFICE 2,541,203

APPARATUS FOR FORMING PLASTIC SHEETS

Robert W. Canfield, West Hartford, Conn., assignor to Plax Corporation, Hartford, Conn., a corporation of Delaware Application October 11, 1947, Serial No. 779,241

6 Claims. (Cl. 18—12)

This invention relates to the production of continuous sheet of molecularly oriented organic polymer and has particular relation to the production of such sheet by heating and extruding polymer in the form of a ribbon and drawing the ribbon longitudinally and transversely to form a molecularly oriented sheet of the desired width and thickness.

It is well known that the strength of certain organic polymers may be substantially increased by drawing so as to orient the molecules of the polymer in the direction or directions in which the stress is applied and capturing the orientation stresses therein. Examples of such polymers are the vinyl compounds and derivatives such as polystyrene, vinyl chloride and co-polymers of or including such compounds or derivatives.

Controlling factors of a process for extruding oriented sheet include the temperature at which the polymer is extruded, the temperature at which the polymer is stretched and the subsequent establishment in the polymer of a temperature which captures the orientation stresses introduced by stretching.

U. S. Patent No. 2,412,187, granted December 3, 1946, to F. E. Wiley et al., disclosed a process and apparatus for producing oriented sheet of the type heretofore described. The apparatus there shown includes an extruder and nozzle for producing a continuous ribbon of polymer, an oven for conditioning the extruded ribbon to an optimum drawing temperature, means for stretching the ribbon at the latter temperature, means for reducing the temperature of the stretched sheet so as to capture and retain the stretching or orientation stresses in the ribbon after the ribbon has been released from the stretching means, and means in the form of festooning rolls located intermediate the stretching means and the nozzle for reducing or eliminating the stretching stresses in that portion of the ribbon between the festooning rolls and the extrusion nozzle. Inasmuch as the optimum extruding temperature for most polymers is higher than the optimum temperature at which stretching stresses should be exerted to establish molecular orientation, the inclusion of festooning rolls, which restrict the stretching stresses to the downstream portion of the ribbon and reduce or eliminate stressing of the upstream portion intermediate the nozzle and festooning rolls, permits employment of different optimum extruding and stretching temperatures, rather than requiring compromising on a single extruding and stretching temperature.

As pointed out in the aforementioned patent to Wiley et al. the festooning rolls preferably are driven at a predetermined speed such that the thickness of the ribbon between the nozzle and the first rolls is not substantially reduced. Thus, there is no substantial stretching of the ribbon between the end of the nozzle and the rolls. The driving of the ribbon by the rolls may be facilitated by so controlling the temperature of the rolls that the ribbon adheres somewhat to the rolls. Preferably the temperature effect of the rolls on the ribbon is so regulated as to superficially chill the ribbon leaving more or less heat in the ribbon to assist in re-heating it to a predetermined lower temperature for the drawing operation.

Achievement of the desired effects on the ribbon is dependent largely upon the total angular wrap of the ribbon about the festooning rolls and, in practice, it has been found desirable to be able to adjust the amount of wrap.

Accordingly, an object of the present invention is to provide sheet extruding and oriented apparatus of the type illustrated in the Wiley et al. patent having festooning roll mechanism by means of which the amount of wrap may be readily adjusted from a minimum to a maximum wrap, and to any intermediate wrap between those limits, without interrupting the passage of sheet through the festooning rolls and through the sheet producing apparatus of which the festooning rolls form a part.

A further object is to provide apparatus by means of which the number of festooning rolls in contact with ribbon, as well as the total degree of wrap, may be varied without interrupting passage of the ribbon therethrough.

It has been found desirable to maintain various of the festooning rolls at different temperatures than others, and to be able to vary the contact of the ribbon with rolls of different temperatures independently of each other.

It, therefore, is a further object of the invention to provide apparatus by means of which the degree of wrap about some of the festooning rolls may be varied independently of the wrap about others of the festooning rolls.

A still further object is to provide improvements in the methods and apparatus heretofore employed in producing sheet of the type indicated.

These and other objects and advantages of the invention will be brought out in the following specification or will be apparent therefrom or from the accompanying drawings to which the specification refers and in which drawings:

Fig. 1 is a view in side elevation of apparatus including a nozzle, gripping bars and novel festooning roll assembly for producing oriented plastic sheets in accordance with the invention, the festooning roll assembly being shown in cross section substantially as viewed from line 1—1 of Fig. 2;

Fig. 2 is a more detailed view of the festooning roll assembly, the right hand portion of which is in front elevation with a portion of a housing broken away, the left hand portion of which is a cross-section generally along line 2—2 of Fig. 1;

Fig. 3 is a cross-sectional view taken on line 3—3 of Fig. 2, illustrating the drive for four of the festooning rolls; and Fig. 4 is a cross-sectional view taken on line 4—4 of Fig. 2 illustrating the drive for two adjustable rolls.

Referring to Fig. 1, it will be seen that the principal parts of the apparatus there illustrated include an extrusion nozzle D through which a heated organic polymer such as polystyrene may be forced, as by means of a stuffer (not shown), and extruded in the form of a flat ribbon R; a festooning roll assembly C including a group of six festooning rolls the position of two of which may be adjusted so as to vary, through a wide range, the amount of wrap of the ribbon R thereabout, and gripping and drawing mechanism indicated at G for drawing the ribbon into molecularly oriented sheet. The nozzle D is only fragmentarily shown, it being understood that a variety of nozzles are available for extruding the plastic ribbon R. Similarly, the grippers G, shown in Fig. 1, are merely illustrative of stretching mechanism generally as, for example, that illustrated and described in detail in the aforementioned patent to Wiley et al.

Referring more particularly to the festooning roll assembly C, there are provided six driven rolls which are rotatably supported in parallel relationship relative to one another in suitable bearings. More particularly the assembly is illustrated as comprising a main housing or base member 1 having a pair of parallel spaced vertical side members 2 and 3 in the latter of which are located the necessary bearings including 4b, 5b, 7b and 9b for the festooning rolls 4, 5, 7 and 9. Corresponding bearings (not shown) are provided in the member 2 which journal the other ends of the rolls. Roll 4 lies adjacent to the nozzle D and in contact with bottom of the ribbon R as the latter is extruded horizontally from the nozzle. The rolls 5, 7 and 9 are located beneath roll 4, and, as illustrated in Fig. 1, with the axis of rotation of roll 9 higher than and spaced from that of roll 7 and with the axis of roll 7 higher than and spaced from that of roll 5. The arrangement of rolls 5, 7 and 9 is such that the grippers G can grip and draw the ribbon R in a horizontal direction from the roll 5 without establishing ribbon contact with rolls 7 and 9.

The side members 2 and 3 are also provided with two pairs of oppositely disposed vertical bearing ways 10a, 10b and 11a, 11b in which bearing blocks 10 and 11, respectively, are mounted for vertical movement. Secured to the ends of the blocks 10 and 11 are the bearings 6a, 6b and 8a, 8b of vertically adjustable festooning rolls 6 and 8. Roll 6 is vertically adjustable between rolls 5 and 7; and roll 8 is similarly adjustable between rolls 7 and 9. Thus, as is apparent from an inspection of Fig. 1, the roll 6 may be moved from a position beneath the rolls 5 and 7, where it is out of contact with the ribbon R, to a position above the rolls 5 and 7 where it establishes wrapping contact which festoons the ribbon. Similarly, the roll 8 may be moved from a position beneath the rolls 7 and 9, where it is out of contact with the ribbon, to a position above rolls 7 and 9 where wrapping contact is established and the ribbon further festooned.

As best illustrated in Figs. 1 and 2, vertical adjustment of each bearing block 10 and 11, and of the rolls 6 and 8, respectively journalled thereon, is effected through vertically disposed lift or jack screws 12 which support the bearing blocks 10 and 11 adjacent their ends. Each block 10 and 11 is provided with two such jack screws 12, the upper ends of which are located by cups 13 secured as by bolts 14 to the under sides of the bearing blocks 10 and 11, and at the same time, restrained against rotation by loose pin connections 15. Each jack screw 12 is supported by its own internally threaded worm-gear bushing 16 which, in turn, is rotatably journalled on its own thrust bearing bracket 17 secured as by the bolts 18 to the housing 1. Secured to the lower end of each bushing 16 is a worm-gear 19. The pair of worm-gears 19, 19 for the pair of jack screws associated with the block 10 and the adjustable roll 6 are provided with a pair of cooperating worms 20, 20 which are secured to a hand shaft 21 rotatably mounted in the shaft-bearing portions 22 of the brackets 17. Similarly, a second pair of like worms 20, 20 are secured to a second hand shaft 23 and cooperatively engage the worm-gears which control the vertical adjustment of the pair of jack-screws associated with the bearing block 11 and its roll 8.

Both hand shafts 21 and 23 may be manually rotated as by hand wheels 21a and 23a, the thus actuated pairs of cooperating worm-gears 19, 19 and worms 20, 20 acting either to raise or to lower both ends of the supported bearing block 10 (or 11) and the roll 6 (or 8) simultaneously an equal amount.

Referring now to the details of the festooning rolls 4 to 9, inclusive, they are generally alike in their construction and arrangement of parts. More particularly, each roll includes a hollow shaft 24 closed at one end by a plug or stop 25. The outer surface of each shaft 24 preferably is ground and polished so as to reduce any tendency to scratch or mar the surface of plastic sheet drawn into contact therewith. The temperature of each shaft is controlled by supplying a liquid coolant to the interior through a concentric inner supply tube 26 from a supply connection 27. The coolant is discharged through the annular space 27 intermediate the concentric shaft 24 and tube 26 and through the exhaust or outlet coupling 28.

The couplings 28 for the rolls 4, 5, 7 and 9 rotatably secure the roll ends located adjacent the vertical frame member 2, whereas the like couplings 28 for the rolls 6 and 8 are similarly secured to the ends located adjacent the frame member 3.

In order to provide a suitable drive for each of the rolls, sprockets 4d, 5d, 6d, 7d, 8d and 9d, respectively, are secured to each roll adjacent the couplings 28. As shown in Fig. 3, a chain 29 together with idler sprockets 30 and 31 and drive sprocket 32 provide with the sprockets 4d, 5d, 7d, and 9d a drive for the rolls 4, 5, 7 and 9. As seen in Fig. 3, the idler sprockets 30 and 31 are rotatably mounted on studs secured to frame 2 and the drive sprocket 32 is secured to drive shaft 33 which is rotatably journalled in bearing members 34a and 34b secured to the frame 1. Rotation of the drive shaft is effected through sprocket 35 and a variable speed chain drive (not shown) or other suitable power source which permits synchronization of the ribbon extrusion speed and the peripheral speed of the festooning rolls.

Also secured to the shaft 33 is a drive sprocket 36 which together with the sprockets 6d and 8d and a chain 37, and idler sprocket 38 provide a drive for the rolls 6 and 8. As shown in Fig. 4, the drive includes a sprocket 39 rotatably supported on the outer end of a weighted lever arm 40 which swings freely on the shaft 33 so as to permit vertical adjustment of the rolls 6 and 8 between their positions shown in full and in phantom in Fig. 4 without disrupting the drive for the rolls.

In the operation of the illustrated and described apparatus the organic polymer, such as for example, polystyrene, from which biaxially oriented sheet is to be formed is heated to an optimum extrusion temperature (370° F.) and while in a solvent free condition is continuously extruded through the die D in the form of the ribbon R which is continuously conveyed by the rolls 4 to 9, inclusive, to the grippers G, and the latter draws the ribbon longitudinally from the rolls as well as transversely in the manner described in the aforementioned patent to Wiley et al. As described in that patent, the temperature of the ribbon may be predeterminedly controlled in one or more enclosing ovens and by suitable heating means.

Preferably, the drive shaft 33 is rotated so as to approximately synchronize the peripheral speed of the roll 4 with the ribbon extrusion speed. The ribbon R first passes through the rolls in the position illustrated in full in Fig. 1 with the grippers G conveying the ribbon forward faster than the extrusion rate and with the consequent necessary elongation of the ribbon occurring in the ribbon between the grippers and the nozzle. Inasmuch as the ribbon in the solid line position shown in Fig. 1 engages only rolls 4 and 5, the total angular wrap of the ribbon about the rolls is small and slippage of the ribbon on the rolls may occur so that stretching stresses are exerted on the portion of the ribbon between the nozzle D and roll 4. Since the ribbon is preferably extruded at a temperature of 370° F., or higher, little if any of the stretching occurring in the ribbon prior to contacting roll 4 is retained as permanent orientation, the relatively high temperature acting to release the orientation before the temperature of the ribbon is sufficiently lowered for the polymer to retain its elastic memory. In order to relieve the portion of the ribbon adjacent the nozzle from stretching forces established by the grippers G, the rolls 6 and 8 are raised by means of their respective hand wheels 21a and 23a, the rolls 6 and 8 moving from the positions shown in solid line (Fig. 1) first into contact with the ribbon R and thence to the positions which they occupy in phantom view in Fig. 1, thus festooning the ribbon R as shown in phantom. It is apparent that the degree of wrap of the ribbon R about each of the rolls 5, 6, 7, 8 and 9, and consequently, the stretching stress in the portion of the ribbon between each adjacent pair of rolls and may be controlled by adjusting the vertical disposition of the rolls 6 and 8. It is also apparent that the adjustment may be effected without discontinuing the continuous extrusion and drawing operations.

In order to maintain the necessary contact between the rolls 4 through 9, inclusive, and the ribbon R so that each roll exerts a frictional pull on the ribbon, it may be necessary to exert at least a slight stretching stress on the portion of the ribbon between the nozzle D and the roll 4. As a result, some stretching of the ribbon may occur between each pair of adjacent rolls. It has been found that where a tendency toward "jumpy" or uneven stretching occurs, such as is evidenced by periodic rather than uniform slippage over the rolls, particularly rolls 8 and 9, the condition may be substantially corrected by speeding up those rolls. Thus, for example, if sprockets 4d, 5d and 6d are each provided with 30 teeth, sprocket 7d may be provided with twenty-nine teeth; sprocket 8d with twenty-eight; and sprocket 9d with twenty-seven. This tends to assure uniformity in the slight slippage of the ribbon R on the rolls and a consequent uniform extension and corresponding uniform reduction in width of the ribbon in passing over the rolls.

When polystyrene is the material involved, roll 4 preferably is cooled to 60° F. by circulating water of that temperature therethrough, and the remaining rolls 5, 6, 7, 8 and 9 are heated to a temperature of 150 to 190° F. by passing water of that temperature therethrough.

Various changes may be made in the process and apparatus described above without departing from the scope of the appended claims.

Having thus described my invention, I claim:

1. Apparatus for forming continuous oriented sheet of solvent-free organic, thermoplastic polymer comprising means including a nozzle for extruding the polymer at a selected extruding temperature in the form of a ribbon, means for drawing said ribbon away from said nozzle at a speed faster than the ribbon is extruded, means positioned intermediate said nozzle and said drawing means for superficially chilling each successive portion of the extruded ribbon and for maintaining substantially constant the dimensions of each portion of the ribbon between the nozzle and said intermediate means, said intermediate means including a plurality of adjustable ribbon festooning rolls, and means for adjusting the location of one of said rolls independently of another of said rolls while continuously drawing said ribbon therethrough, to vary the amount of wrapping contact said ribbon makes with the rolls.

2. Apparatus for forming continuous oriented sheet of solvent-free organic, thermoplastic polymer comprising means including a nozzle for extruding the polymer at a selected extruding temperature in the form of a ribbon, means for drawing said ribbon away from said nozzle at a speed faster than the ribbon is extruded, means positioned intermediate said nozzle and said drawing means for superficially chilling each successive portion of the extruded ribbon and for maintaining substantially constant the dimensions of each portion of the ribbon between the nozzle and said intermediate means, said intermediate means including a plurality of ribbon festooning rolls, and means for moving one of said rolls in a straight line into and out of contact with said ribbon while continuously drawing said ribbon therethrough.

3. Apparatus for forming continuous oriented sheet of solvent-free organic, thermoplastic polymer comprising means including a nozzle for extruding the polymer at a selected extruding temperature in the form of a ribbon, means for drawing said ribbon away from said nozzle at a speed faster than the ribbon is extruded, means positioned intermediate said nozzle and said drawing means for superficially chilling each successive portion of the extruded ribbon and for maintaining substantially constant the dimensions of each portion of the ribbon between the nozzle and said intermediate means, said intermediate means including a plurality of ribbon festooning rolls, and means for adjusting the positions of a plurality of said rolls independently of one another.

4. Apparatus for forming continuous oriented sheet of solvent-free organic, thermoplastic polymer comprising means including a nozzle for extruding the polymer at a selected extruding temperature in the form of a ribbon, means positioned adjacent to said nozzle to superficially chill each successive portion of the extruded ribbon and to maintain substantially constant the dimensions of each portion of the ribbon between the nozzle and said means, said means including a plurality of ribbon festooning rolls having successively increased surface speeds downstream of the nozzle, a plurality of said rolls which are independently adjustable relative to one another and movable into and out of engagement with said ribbon to vary the degree of wrap of the ribbon about said rolls, and means for stretching and orienting said ribbon downstream of one of said rolls.

5. Apparatus for forming continuous oriented sheet of solvent-free organic, thermoplastic polymer comprising means including a nozzle for extruding the polymer at a selected extruding temperature in the form of a ribbon, means positioned adjacent to said nozzle to superficially chill each successive portion of the extruded ribbon and to maintain substantially constant the dimensions of each portion of the ribbon between the nozzle and said means, said means including a plurality of ribbon festooning rolls and means for adjusting a roll to vary the degree of wrap of the ribbon about at least two of said rolls while maintaining the degree of wrap about at least two other of said rolls, and means for stretching and orienting said ribbon downstream of one of said festooning rolls.

6. Apparatus for forming continuous oriented sheet of solvent-free organic, thermoplastic polymer comprising means including a nozzle for extruding the polymer at a selected extruding temperature in the form of a ribbon, means positioned adjacent to said nozzle to superficially chill each successive portion of the extruded ribbon and to maintain substantially constant the dimensions of each portion of the ribbon between the nozzle and said means, said means including a plurality of ribbon festooning rolls, and means including vertically adjustable bearings for at least one of said rolls for varying the relative positions of said rolls and the degree of wrap of the ribbon about said rolls, and means for stretching and orienting the portion of said ribbon downstream of one of said rolls.

ROBERT W. CANFIELD.

REFERENCES CITED

The following references are of record in the file of this patent:

UNITED STATES PATENTS

| Number | Name | Date |
|---|---|---|
| 898,111 | Huber et al. | Sept. 8, 1908 |
| 2,412,187 | Wiley et al. | Dec. 3, 1946 |

FOREIGN PATENTS

| Number | Country | Date |
|---|---|---|
| 368,886 | Great Britain | Mar. 17, 1932 |
| 561,623 | Great Britain | May 26, 1944 |